US012730805B2

(12) United States Patent
Kodikal et al.

(10) Patent No.: US 12,730,805 B2
(45) Date of Patent: Sep. 8, 2026

(54) SYSTEMS AND METHODS FOR DATA AGGREGATION AND SUGGESTION GENERATION

(71) Applicant: SAP SE, Walldorf (DE)

(72) Inventors: Rajesh Kodikal, Bangalore (IN); Amulya S.U, Bangalore (IN); Jaggayyagari Raghava, Gajwel (IN); Akshaya Gopal, Bangalore (IN)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 18/982,443

(22) Filed: Dec. 16, 2024

(65) Prior Publication Data

US 2026/0169983 A1 Jun. 18, 2026

(51) Int. Cl.
*G06F 16/242* (2019.01)
*G06F 16/28* (2019.01)

(52) U.S. Cl.
CPC .......... *G06F 16/244* (2019.01); *G06F 16/285* (2019.01)

(58) Field of Classification Search
CPC .. G06F 16/244; G06F 16/285; G06F 16/9535; G06F 2221/2141; G06F 16/9536; G06F 16/367
USPC ........................................................ 707/737
See application file for complete search history.

(56) References Cited

U.S. PATENT DOCUMENTS

| | | | | |
|---|---|---|---|---|
| 10,922,493 | B1 * | 2/2021 | Das | G06N 3/09 |
| 2006/0004814 | A1 * | 1/2006 | Lawrence | G06F 16/22 |
| 2012/0047184 | A1 * | 2/2012 | Purdy | G06Q 30/0204 707/E17.005 |
| 2015/0058326 | A1 * | 2/2015 | Zhang | G06F 16/24578 707/722 |
| 2017/0031998 | A1 * | 2/2017 | Olivier | G06F 16/24575 |
| 2017/0032023 | A1 * | 2/2017 | Mitra | G06F 16/21 |
| 2019/0327330 | A1 * | 10/2019 | Natarajan | H04L 41/20 |
| 2020/0004887 | A1 * | 1/2020 | Huang | G06Q 30/0202 |
| 2021/0173887 | A1 * | 6/2021 | Petersen | G06F 16/9536 |
| 2022/0382764 | A1 * | 12/2022 | Xu | G06Q 30/0201 |

* cited by examiner

*Primary Examiner* — Evan Aspinwall
(74) *Attorney, Agent, or Firm* — Fountainhead Law Group, PC

(57) ABSTRACT

Embodiments of the present disclosure include techniques for data aggregation and suggestion generation. In one embodiment, profile information from remote systems is cached in a local database. As searches are issued in the remote systems, event messages comprising search artifacts are generated and sent to the database. The search artifacts are aggregated and stored in the local database. A profile may be analyzed based on the stored data and suggestions are provided regarding attribute values that may be added to the profile to improve search performance.

20 Claims, 4 Drawing Sheets

301
buyer
302
Search IO
303
Search service
304
Index db
305
Event service
306
Insight service
307
Insight bkend
308
DB
310
311
312
313
314
315
316
317
318
319
320
321
322

401
buyer
402
Search App
403
profile
404
TPD
405
Event service
406
Insight service
407
Insight bkend
408
DB
410
411
412
413
414
415
416
417
418
419
420
421
422

SYSTEMS AND METHODS FOR DATA AGGREGATION AND SUGGESTION GENERATION

BACKGROUND

The present disclosure relates generally to computer software systems, and in particular, to systems and methods for data aggregation and suggestion generation.

Profile information about various entities allows search engines to quickly and easily return relevant results in response to search queries. Profile information may contain information about a wide variety of entities, such as objects, products, people, and other items existing in a computer system. Given the enormous volumes of profile information existing across various computer system, such as particular applications, computer networks, or the Internet, it can be technically challenging to ensure that various computer systems are returning the most relevant results to their queries.

The technical challenges are compounded when the items, and corresponding profile information, are distributed across many systems. Profile information can be voluminous in many cases, and accessing such information from multiple systems can be computationally intensive and slow.

Therefore, contemporary search systems suffer from the technical challenge of efficiently searching for relevant profile information. The following disclosure provides various solutions to technical problems associated with such systems.

DETAILED DESCRIPTION

Described herein are techniques for data aggregation and suggestion generation. In the following description, for purposes of explanation, numerous examples and specific details are set forth in order to provide a thorough understanding of some embodiments. Various embodiments as defined by the claims may include some or all of the features in these examples alone or in combination with other features described below and may further include modifications and equivalents of the features and concepts described herein.

Figure 1:
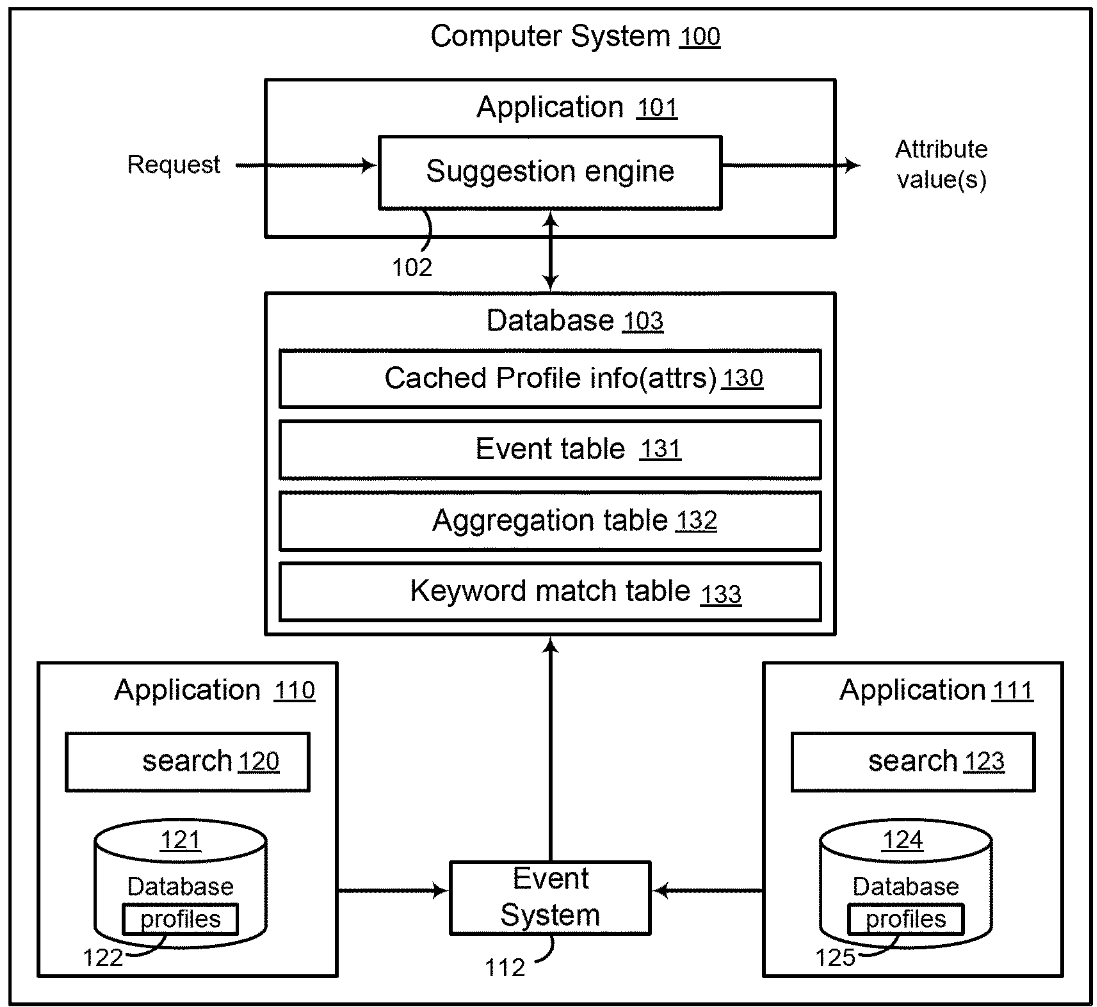
FIG. 1 illustrates a system for data aggregation and suggestion generation according to an embodiment.

FIG. 1 illustrates a system for data aggregation and suggestion generation according to an embodiment. Features and advantages of the present disclosure include an application 101 comprising a suggestion engine 102 and database 103 executing on a computer system 100. Computer system 100 may include, for example, one or more computers comprising one or more processors and a computer readable medium (memory) for executing software to perform the techniques described herein. Here, embodiments of the present disclosure include techniques for aggregating search artifacts related to profiles on external systems, which may be used to generate suggested outputs of attribute values for entities, for example. Embodiments of the present disclosure overcome the technical challenges associated with processing data based on information spread out across many different systems, which can be slow and challenging to consolidate. Further examples for overcoming the technical challenges are described in more detail below.

Initially, the database 103 may receive profile information for profiles on multiple external applications 110-111. The profile information may be received from each remote application, which may be a slow process since it requires communications with multiple remote systems, and cached locally by storing the profile information 130 in database 103. The cached profile information 130 may include a plurality of attributes (aka, profile attributes) describing aspects of different entities. Example attributes include, for each profile, a unique entity identifier, a location, a first class, a second class, keywords, a sustainability rating, a profile verification, and certifications (e.g., an ISO certification), for example. The first class and second class may form a portion of a hierarchical classification system, for example, where the first class is a lowest class in the classification hierarchy (e.g., a commodity description) and the second class is a level above the lowest class (e.g., describing classes of commodities, such as the class "computing devices" for commodities "computers," "notebooks," or "tablets").

Profiles for entities may exist across a number of different applications. In this example, profile information 122 is stored in database 121 associated with application 110 and profile information 125 is stored in database 124 associated with application 111. While applications 110 and 111 are shown here for illustrative purposes, it is to be understood that many additional software systems may have profile information as described herein. Users of the different systems may enter searches, and search results may produce search artifacts based on the profile information associated with different entities. For example, searches in application 110 may be performed by a search component 120 and searches in application 111 may be performed by a search component 123. A search may return several profile "appearances" (aka, "hits") based on the search terms entered and the profile information for each entity (e.g., direct matches or similarity matches between search terms and profile attribute values). In some embodiments, searches and related search artifacts may trigger generation of an event message by applications 110-111. The event messages comprise information about the search, including search artifacts associated with the profiles. Example search artifacts may include, for example, one or more search terms, an ID of an entity returned in a search result, keywords matched in the profile, and/or the first and second classes mentioned above in a profile that appeared in response to a search. Additionally, if a search result translates into a particular profile being viewed, an event may include an entity ID and an indication that the profile for the entity was viewed, for example. Event messages may be sent to an event system 112 (e.g., Apache® Kafka®), which forwards event messages for storage in database 103. Accordingly, database 103 receives and stores event messages in an event table 131.

Features and advantages of the present disclosure include aggregating search artifacts for each profile to produce aggregated search artifacts. As mentioned above, event table 131 stores search artifacts, which may include search appearances or profile views. The search appearances and/or views may be aggregated for each profile to produce a total number of search appearances and/or a total number of views, for example. The aggregated search artifacts are then stored in database 103 in aggregation table 132, for example, where each aggregated search artifact is associated with one unique entity identifier to specify an associated profile.

In some embodiments, database 103 includes a keyword match table 133. Keyword match table 133 may include records (e.g., rows) for entries of the event table where a keyword resulted in a match, including commodity matches, keywords that matched, location matches, and associated entity IDs, for example.

Suggestion engine 102 may be used to access the stored data and produce suggestions for modifying a profile of an entity to achieve better search performance across a plurality of different systems. For instance, suggestion engine 102 may receive a request to generate a suggestion for a particular profile of a particular entity. Suggestion engine 102 may retrieve in response to the request, profile information from database 101 for a plurality of other profiles. For example, suggestion engine 102 may retrieve profile information having the same location to provide suggestions that are geographically relevant. Suggestion engine 102 may retrieve profile information having the same second class, mentioned above. For example, the system may advantageously use the hierarchical nature of the classification system to capture more profiles by retrieving profiles one or more levels up from the narrowest class (e.g., the first class, such as a commodity description). An example hierarchical classification system may comprise, for example, United Nations Standard Products and Services Codes® (UNSPSC®). Another example hierarchy may include a lowest level (L4) specifying a commodity, one level up (L3) specifying a class (or genus), another level up (L2) specifying a family, and a top level (L1) specifying a segment, for example. In some embodiments, suggestion engine 102 may additionally retrieve profile information where the number of aggregated search artifacts of the retrieved profiles is greater than the number of aggregated search artifacts for the profile for which the suggestion is being made. For example, in some embodiments, profiles are retrieved where the number of search appearances is greater than the number of search appearances for the profile associated with the request. In other embodiments, profiles are retrieved where the number of views is greater than the number of views for the profile associated with the request. In some embodiments, the retrieved profile information for the other profiles comprises a top N most viewed profiles having a number of views greater than the number of views for the profile associated with the request, for example.

Next, suggestion engine 102 may determine overlapping attribute values of additional attributes of the retrieved profile information for the other profiles that are not included in the additional attributes of the first profile. The overlapping attribute values may comprise attribute values in the profile information of multiple other profiles of other entities that are not in the profile of the entity associated with the suggestion, for example. Accordingly, suggestion engine 102 may output the overlapping attribute values as a suggestion for the current entity to add to their profile to achieve better search results performance, for example.

In one embodiment, suggestion engine 102 may determine overlapping attribute values of the additional attributes by determining a number of other profiles having a particular overlapping attribute value and comparing the number of other profiles having the particular overlapping attribute value to a threshold value. An overlapping attribute value may be included in the output overlapping attribute values when the number of other profiles having the particular overlapping attribute value is greater than the threshold value, and the particular overlapping attribute value may not be included in the output overlapping attribute values when the number of other profiles having the particular overlapping attribute value is less than the threshold value.

Figure 2:
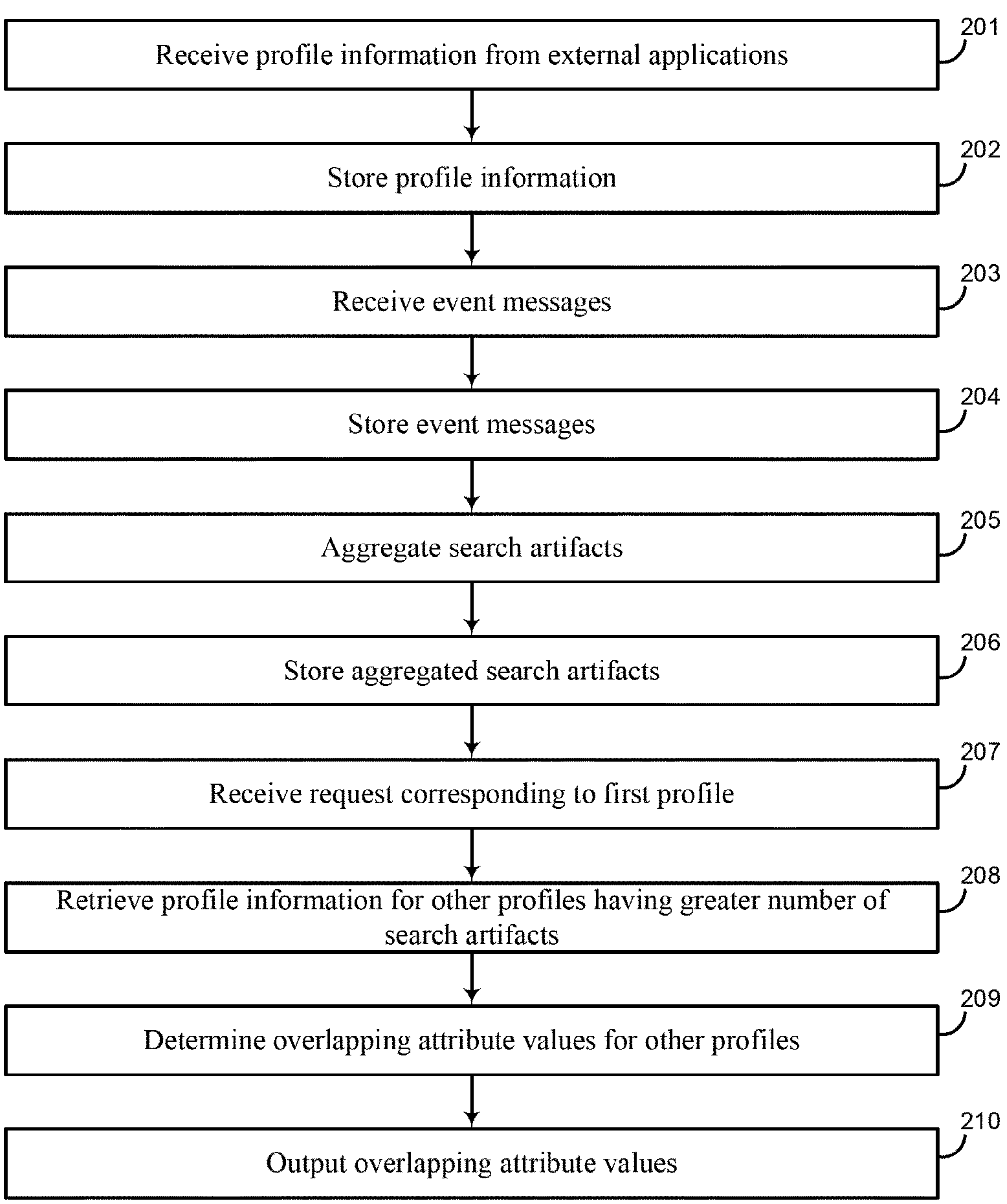
FIG. 2 illustrates a method for data aggregation and suggestion generation according to an embodiment.

FIG. 2 illustrates a method for data aggregation and suggestion generation according to an embodiment. The method of FIG. 2 can be performed by one or more of the components illustrated in FIG. 1 including, for example, application 101 and database 103. At 201, profile information for a plurality of profiles on the plurality of external applications is received from a plurality of external applications. The profile information comprises a plurality of attributes, the attributes including a unique entity identifier, a location, a first class, a second class, and the plurality of additional entity attributes. The first class and second class form a portion of a hierarchical classification system, where the first class is a lowest class in the classification hierarchy and the second class is a level above the lowest class. At 202, the profile information is stored (aka, cached locally) in a database. At 203, event messages are received. The event messages are generated in response to search queries performed on the external applications. The event messages comprise search artifacts (e.g., appearances, views) associated with the plurality of profiles. At 204, the event messages are stored in the database. At 205, search artifacts for each profile of the plurality of profiles are aggregated to produce aggregated search artifacts. Aggregating the search artifacts can include, for example, determining the total appearances or views for each profile. At 206, the aggregated search artifacts are stored in the database and each aggregated search artifact is associated with one unique entity identifier and profile. At 207, a request corresponding to a profile being promoted is received in a suggestion engine. At 208, in response to the request, profile information for a plurality of other profiles is retrieved from the database. The other profiles may have a same location, a same second class, and a number of aggregated search artifacts greater than a number of aggregated search artifacts for the first profile (e.g., more views that the promoted profile). At 209, overlapping attribute values of attributes of the retrieved profile information not included in the profile being promoted are determine. Such overlapping attribute values may be the suggested attribute values for the profile being promoted, for example. At 210, the overlapping attribute values are output (e.g., for presentation to a user).

Figures 3, 4:
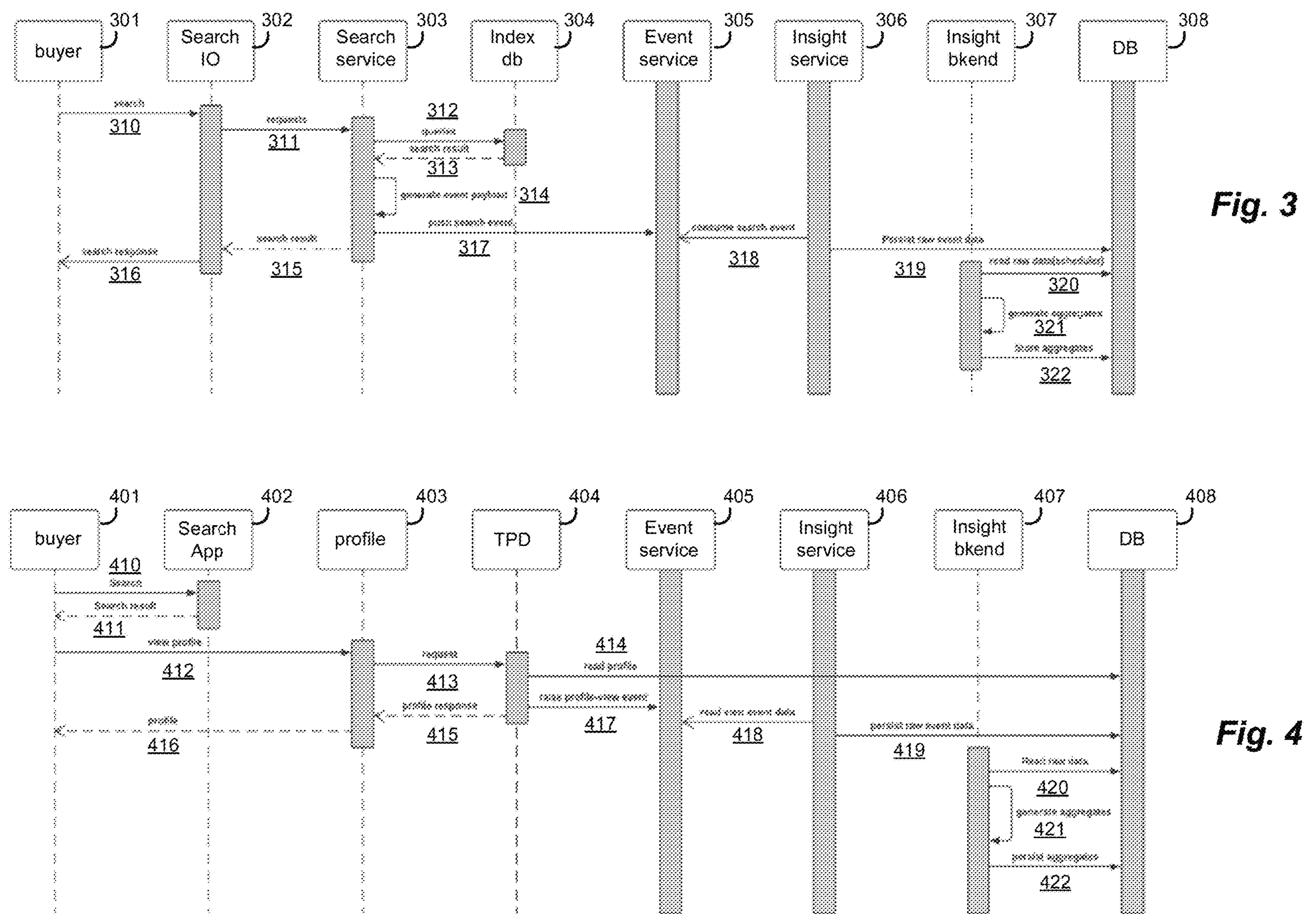
FIG. 3 illustrates an example process based on search data according to an embodiment.
FIG. 4 illustrates an example process based on views according to another embodiment.

FIG. 3 illustrates an example process based on search data according to an embodiment. In this example, entities are buyers and suppliers, and a supplier may desire to improve their profile information to be more relevant to buyers. At 310, a buyer computer 301 issues a search for suppliers to a search interface (IO) 302, which issues a request 311 to a search service 303. Search service 303 issues a query 312 to an index storage system 304, which returns a search result 313. At 314, search service 303 generates an event message comprising search artifacts (results and other information), which is sent to search IO 302 at 315 and the buyer's computer at 316. Additionally, the event message is pushed, at 317, to an event service 305. An application (e.g., insight service 306) may retrieve event messages at 318 and persist them, at 319, in database (DB) 308. At 320, the insight backend 307 reads the raw data (e.g., on a periodic basis using a scheduler), aggregates the data as described above at 321, and stores the aggregated data in DB 308 at 322. The insight service is now ready to provide suggestions to suppliers based on aggregated search appearance data.

FIG. 4 illustrates an example process based on views according to another embodiment. At 410, a buyer computer 401 issues a search for suppliers to a search app 402, which returns a search result 411. At 412, the buyer may view profile information returned in the search. The profile view is sent to profile 403, which issues a request to TPD 404 at 413. In this example, the "Profile" component is an user interface application which is used to view profile of a supplier, and the "TPD" Component stands for Trading Partner Directory which is a backend Repository which stores profile information and also triggers events. TPD 404 reads the profile information from DB 408 at 414 and provides the profile response to profile 403 at 415, which in turn sends the profile information to the buyer computer 401 at 416. TPD 404 further sends a "profile view" event to event service 405 at 417. Insight service 406 reads the view event data at 418 and persists the raw event data in DB 408 at 419. At 420, the insight backend 407 reads the raw data (e.g., on a periodic basis using a scheduler), aggregates the data as described above at 421, and stores the aggregated data in DB 408 at 422. The insight service is now ready to provide suggestions to suppliers based on aggregated view data.

At this stage, for each supplier profile being promoted (aka, promote supplier), suggestions are generated using view and/or search aggregates. In the following examples, suggestions are generated by comparing a promote supplier with other suppliers in the same location and comparing to the same product category. Under UNSPSC classification there are 4 levels of product category: Segment (L1), Family (L2), Class (L3), and Commodity (L4). Suppliers may maintain only L4 level items as product categories in their profile, for example. But while comparing two suppliers the system goes one level up (L3) and compares the suppliers since it will give better insights. The following are the profile attributes used to generate suggestions in this example: Profile verification, Sustainability Ratings, Non Diversity certifications, Keywords, and Commodities.

In the search result case, attributes of the promote supplier are compared with attributes of the top 10 suppliers having same location and product category and who have more search appearances. If the top suppliers have overlapping attributes above a threshold value and if the promote supplier does not have these attributes, the missing attribute is marked as a suggestion as illustrated in the following example scenario:

| Supplier 1 |
|---|
| Keywords : "Door", "Gate", "Window"<br>Sustainability Rating : "true"<br>Profile Verification: "true"<br>Certification: "ISO:8001", "ISO:8005"<br>Commodities: "Construction Material",""<br>Search Appearance Count : 100 |
| Supplier 2 |
| Keywords : "Wood Gate", "PVC Door"<br>Sustainability Rating : "false"<br>Profile Verification: "true"<br>Certification: "ISO:8001"<br>Commodities: "Construction Material"<br>Search Appearance Count : 122 |
| Supplier 3 |
| Keywords : "Gate", "Window"<br>Sustainability Rating : "false"<br>Profile Verification: "true"<br>Certification: "ISO:8003"<br>Commodities: "Construction Material"<br>Search Appearance Count : 182 |
| Supplier 4 |
| Keywords : "Wooden Door"<br>Sustainability Rating : "false"<br>Profile Verification: "true"<br>Certification: "ISO:8003"<br>Commodities: "Construction Material"<br>Search Appearance Count : 22 |
| Promote Supplier |
| Keywords : "Door"<br>Sustainability Rating : "false"<br>Profile Verification: "false"<br>Certification: "ISO:8005"<br>Commodities: "Construction Material"<br>Search Appearance Count : 80 |

In this example, the promote supplier above has 80 search appearances and Supplier 4 has 22. Thus, Supplier 4 will be ignored as their search appearance is less than that of the promote supplier. In this scenario on comparison, promote supplier will be prompted to add the following attributes to his profile: Keywords: "Gate", "Window". Two out of three competitors have these in their profiles. Further, all the 3 profiles being compared have their profiles verified (e.g., Profile Verification: "true"). In addition to the existing "ISO:80005" certificate promote supplier will be prompted to add "ISO:8001", since 2 of the suppliers have them in their profile. No suggestions are provided for commodity or Sustainability rating since there are not enough data points to make a suggestion (e.g., number of other profiles having the particular overlapping attribute value is less than the threshold value).

In the case of suggestions based on views, the above mentioned attributes of the promote supplier are compared with attributes of the top 10 suppliers in the same location and product category who have more views. If the top suppliers have overlapping attributes above a threshold value and if the promote supplier does not have these attributes, the missing attribute is marked as suggestion as illustrated in the following example scenario:

| Supplier 1 |
|---|
| Keywords : "Computer", "Laptop"<br>Sustainability Rating : "true"<br>Profile Verification: "true"<br>Certification: "ISO:8001", "ISO:8005"<br>Commodities: "Computer"<br>Views : 200 |
| Supplier 2 |
| Keywords : "Computer", "Laptop", "PC", "Personal Computer"<br>Sustainability Rating : "false"<br>Profile Verification: "true"<br>Certification: "ISO:8001"<br>Commodities: "Computer"<br>Views : 229 |
| Supplier 3 |
| Keywords : "Computer", "Personal Computer"<br>Sustainability Rating : "false"<br>Profile Verification: "true"<br>Certification: "ISO:8003"<br>Commodities: "Computer"<br>Views : 322 |
| Promote Supplier |
| Keywords : "Computer"<br>Sustainability Rating : "false" |

-continued

```
Profile Verification: "false"
Certification: "ISO:8005"
Commodities: "Computer"
Views : 155
```

In this scenario, on comparison, the promote supplier will be prompted to add following attributes to his profile: Keywords: "Personal Computer"—2 out of 3 competitors have these added in their profiles, Profile Verification: "true"—all the 3 profiles being compared have their profiles verified, Certification: "ISO:8001"—in addition to the existing "ISO:80005" certificate, promote supplier will be prompted to add "ISO:8001", since 2 of the suppliers have them in their profile. No suggestions are provided for commodity or Sustainability rating since there are not have enough data points to make a suggestion.

Figure 5:
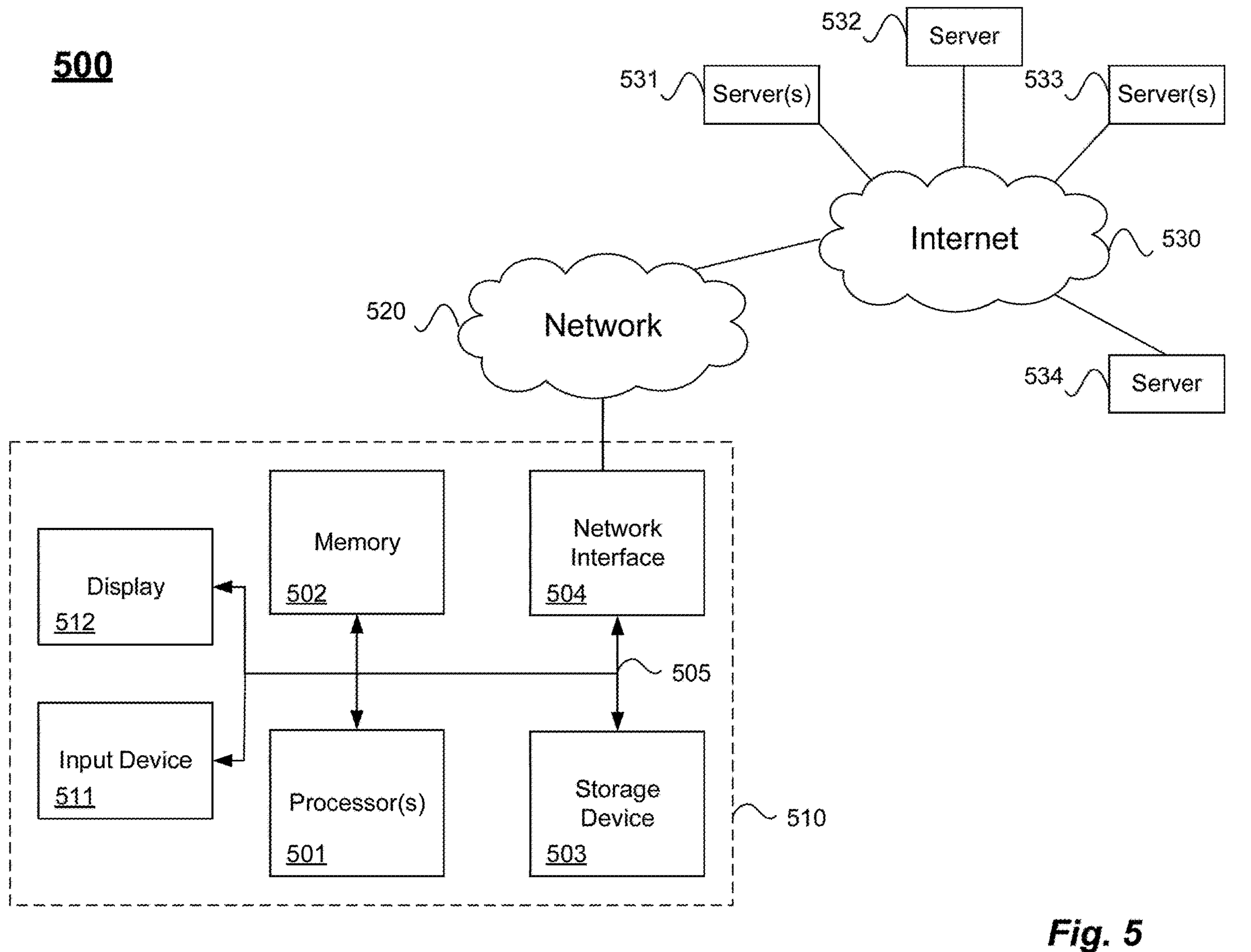
FIG. 5 illustrates hardware of a special purpose computing system configured according to the above disclosure.

FIG. 5 illustrates hardware of a special purpose computing system 500 configured according to the above disclosure. The following hardware description is merely one example. It is to be understood that a variety of computers topologies may be used to implement the above-described techniques. An example computer system 510 is illustrated in FIG. 5. Computer system 510 includes a bus 505 or other communication mechanism for communicating information, and one or more processor(s) 501 coupled with bus 505 for processing information. Computer system 510 also includes memory 502 coupled to bus 505 for storing information and instructions to be executed by processor 501, including information and instructions for performing some of the techniques described above, for example. Memory 502 may also be used for storing programs executed by processor(s) 501. Possible implementations of memory 502 may be, but are not limited to, random access memory (RAM), read only memory (ROM), or both. A storage device 503 is also provided for storing information and instructions. Common forms of storage devices include, for example, a hard drive, a magnetic disk, an optical disk, a CD-ROM, a DVD, solid state disk, a flash or other non-volatile memory, a USB memory card, or any other electronic storage medium from which a computer can read. Storage device 503 may include source code, binary code, or software files for performing the techniques above, for example. Storage device 503 and memory 502 are both examples of non-transitory computer readable storage mediums (aka, storage media).

In some systems, computer system 510 may be coupled via bus 505 to a display 512 for displaying information to a computer user. An input device 511 such as a keyboard, touchscreen, and/or mouse is coupled to bus 505 for communicating information and command selections from the user to processor 501. The combination of these components allows the user to communicate with the system. In some systems, bus 505 represents multiple specialized buses for coupling various components of the computer together, for example.

Computer system 510 also includes a network interface 504 coupled with bus 505. Network interface 504 may provide two-way data communication between computer system 510 and a local network 520. Network 520 may represent one or multiple networking technologies, such as Ethernet, local wireless networks (e.g., WiFi), or cellular networks, for example. The network interface 504 may be a wireless or wired connection, for example. Computer system 510 can send and receive information through the network interface 504 across a wired or wireless local area network, an Intranet, or a cellular network to the Internet 530, for example. In some embodiments, a frontend (e.g., a browser), for example, may access data and features on backend software systems that may reside on multiple different hardware servers on-prem 531 or across the network 530 (e.g., an Extranet or the Internet) on servers 532-534. One or more of servers 532-534 may also reside in a cloud computing environment, for example.

FURTHER EXAMPLES

Each of the following non-limiting features in the following examples may stand on its own or may be combined in various permutations or combinations with one or more of the other features in the examples below. In various embodiments, the present disclosure may be implemented as a system, method, or computer readable medium.

Embodiments of the present disclosure may include systems, methods, or computer readable media. In one embodiment, the present disclosure includes computer system comprising: at least one processor and at least one non-transitory computer readable medium (e.g., memory) storing computer executable instructions that, when executed by the at least one processor, cause the computer system to perform methods as described herein and in the following examples. In another embodiment, the present disclosure includes a non-transitory computer-readable medium storing computer-executable instructions that, when executed by at least one processor, perform the methods as described herein and in the following examples.

In one embodiment, the present disclosure includes a computer implemented method comprising: receiving, from a plurality of external applications, profile information for a plurality of profiles on the plurality of external applications, the profile information comprising a plurality of attributes, the attributes including a unique entity identifier, a location, a first class, a second class, and the plurality of additional entity attributes, wherein the first class and second class form a portion of a hierarchical classification system, and wherein the first class is a lowest class in the classification hierarchy and the second class is a level above the lowest class; storing the profile information in a database; receiving a plurality of event messages, wherein the event messages are generated in response to search queries performed on the plurality of external applications, the plurality of event messages comprising search artifacts associated with the plurality of profiles; storing the event messages in the database; aggregating search artifacts for each profile of the plurality of profiles to produce aggregated search artifacts; storing the aggregated search artifacts in the database, wherein each aggregated search artifact is associated with one unique entity identifier; receiving, in a suggestion engine, a request corresponding to a first profile of the plurality of profiles; retrieving, from the database, in response to the request, profile information for a plurality of other profiles having a same location, a same second class, and a number of aggregated search artifacts greater than a number of aggregated search artifacts for the first profile; determining overlapping attribute values of the additional attributes of the retrieved profile information for the plurality of other profiles that are not included in the additional attributes of the first profile; and outputting the overlapping attribute values.

In one embodiment, the search artifacts comprise search appearances.

In one embodiment, the number of aggregated search artifacts greater than the number of aggregated search artifacts for the first profile comprises a number of search appearances greater than a number of search appearance counts for the first profile.

In one embodiment, the search artifacts comprise views.

In one embodiment, the number of aggregated search artifacts greater than the number of aggregated search artifacts for the first profile comprises a number of views greater than a number of views for the first profile.

In one embodiment, the retrieved profile information for the plurality of other profiles comprises a top N most viewed profiles having said number of views greater than the number of views for the first profile.

In one embodiment, determining overlapping attribute values of the additional attributes of the retrieved profile information for the plurality of other profiles that are not included in the additional attributes of the first profile comprises, for each overlapping attribute: determining a number of other profiles having a particular overlapping attribute value; and comparing the number of other profiles having the particular overlapping attribute value to a threshold value, wherein the particular overlapping attribute value is included in the output overlapping attribute values when the number of other profiles having the particular overlapping attribute value is greater than the threshold value, and wherein the particular overlapping attribute value is not included in the output overlapping attribute values when the number of other profiles having the particular overlapping attribute value is less than the threshold value.

In one embodiment, the first class and second class are UNSPSC codes.

In one embodiment, the plurality of additional attributes comprise a profile verification.

In one embodiment, the plurality of additional attributes comprise a sustainability rating.

In one embodiment, the plurality of additional attributes comprise an ISO certification.

In one embodiment, the plurality of additional attributes comprise one or more keywords.

The above description illustrates various embodiments along with examples of how aspects of some embodiments may be implemented. The above examples and embodiments should not be deemed to be the only embodiments, and are presented to illustrate the flexibility and advantages of some embodiments as defined by the following claims. Based on the above disclosure and the following claims, other arrangements, embodiments, implementations, and equivalents may be employed without departing from the scope hereof as defined by the claims.

What is claimed is:

1. A computer implemented method comprising:

receiving, from a plurality of external applications, profile information for a plurality of profiles on the plurality of external applications, the profile information comprising a plurality of attributes, the attributes including a unique entity identifier, a location, a first class, a second class, and the plurality of additional entity attributes, wherein the first class and second class form a portion of a hierarchical classification system, and wherein the first class is a lowest class in the classification hierarchy and the second class is a level above the lowest class;

storing the profile information in a database;

receiving a plurality of event messages, wherein the event messages are generated in response to search queries performed on the plurality of external applications, the plurality of event messages comprising search artifacts associated with the plurality of profiles;

storing the event messages in the database;

aggregating search artifacts for each profile of the plurality of profiles to produce aggregated search artifacts;

storing the aggregated search artifacts in the database, wherein each aggregated search artifact is associated with one unique entity identifier;

receiving, in a suggestion engine, a request corresponding to a first profile of the plurality of profiles;

retrieving, from the database, in response to the request, profile information for a plurality of other profiles having a same location, a same second class, and a number of aggregated search artifacts greater than a number of aggregated search artifacts for the first profile; and outputting overlapping attribute values, the overlapping attribute values being attribute values of the additional attributes of the retrieved profile information for the plurality of other profiles that are not included in the additional attributes of the first profile.

2. The method of claim 1, wherein the search artifacts comprise search appearances.

3. The method of claim 2, wherein the number of aggregated search artifacts greater than the number of aggregated search artifacts for the first profile comprises a number of search appearances greater than a number of search appearance counts for the first profile.

4. The method of claim 1, wherein the search artifacts comprise views.

5. The method of claim 3, wherein the number of aggregated search artifacts greater than the number of aggregated search artifacts for the first profile comprises a number of views greater than a number of views for the first profile.

6. The method of claim 5, wherein the retrieved profile information for the plurality of other profiles comprises a top N most viewed profiles having said number of views greater than the number of views for the first profile.

7. The method of claim 1, wherein determining overlapping attribute values of the additional attributes of the retrieved profile information for the plurality of other profiles that are not included in the additional attributes of the first profile comprises, for each overlapping attribute:

determining a number of other profiles having a particular overlapping attribute value; and comparing the number of other profiles having the particular overlapping attribute value to a threshold value, wherein the particular overlapping attribute value is included in the output overlapping attribute values when the number of other profiles having the particular overlapping attribute value is greater than the threshold value, and wherein the particular overlapping attribute value is not included in the output overlapping attribute values when the number of other profiles having the particular overlapping attribute value is less than the threshold value.

8. The method of claim 1, wherein the first class and second class are UNSPSC codes.

9. The method of claim 1, wherein the plurality of additional attributes comprise one or more of a profile verification, a sustainability rating, an ISO certification, or one or more keywords.

10. A computer system comprising:

at least one processor;

at least one non-transitory computer-readable medium storing computer-executable instructions that, when executed by the at least one processor, cause the computer system to execute a method comprising:

receiving, from a plurality of external applications, profile information for a plurality of profiles on the plurality of external applications, the profile information comprising a plurality of attributes, the attributes including a unique entity identifier, a location, a first class, a second class, and the plurality of additional entity attributes, wherein the first class and second class form a portion of a hierarchical classification system, and wherein the first class is a lowest class in the classification hierarchy and the second class is a level above the lowest class;

storing the profile information in a database;

receiving a plurality of event messages, wherein the event messages are generated in response to search queries performed on the plurality of external applications, the plurality of event messages comprising search artifacts associated with the plurality of profiles;

storing the event messages in the database;

aggregating search artifacts for each profile of the plurality of profiles to produce aggregated search artifacts;

storing the aggregated search artifacts in the database, wherein each aggregated search artifact is associated with one unique entity identifier;

receiving, in a suggestion engine, a request corresponding to a first profile of the plurality of profiles;

retrieving, from the database, in response to the request, profile information for a plurality of other profiles having a same location, a same second class, and a number of aggregated search artifacts greater than a number of aggregated search artifacts for the first profile; and outputting overlapping attribute values, the overlapping attribute values being attribute values of the additional attributes of the retrieved profile information for the plurality of other profiles that are not included in the additional attributes of the first profile.

11. The computer system of claim 10, wherein the search artifacts comprise search appearances.

12. The computer system of claim 10, wherein the search artifacts comprise views.

13. The computer system of claim 10, wherein determining overlapping attribute values of the additional attributes of the retrieved profile information for the plurality of other profiles that are not included in the additional attributes of the first profile comprises, for each overlapping attribute:

determining a number of other profiles having a particular overlapping attribute value; and comparing the number of other profiles having the particular overlapping attribute value to a threshold value, wherein the particular overlapping attribute value is included in the output overlapping attribute values when the number of other profiles having the particular overlapping attribute value is greater than the threshold value, and wherein the particular overlapping attribute value is not included in the output overlapping attribute values when the number of other profiles having the particular overlapping attribute value is less than the threshold value.

14. The computer system of claim 10, wherein the first class and second class are UNSPSC codes.

15. The computer system of claim 10, wherein the plurality of additional attributes comprise one or more of a profile verification, a sustainability rating, an ISO certification, or one or more keywords.

16. A non-transitory computer-readable medium storing computer-executable instructions that, when executed by at least one processor of a computer system, cause the computer system to execute method comprising:

receiving, from a plurality of external applications, profile information for a plurality of profiles on the plurality of external applications, the profile information comprising a plurality of attributes, the attributes including a unique entity identifier, a location, a first class, a second class, and the plurality of additional entity attributes, wherein the first class and second class form a portion of a hierarchical classification system, and wherein the first class is a lowest class in the classification hierarchy and the second class is a level above the lowest class;

storing the profile information in a database;

receiving a plurality of event messages, wherein the event messages are generated in response to search queries performed on the plurality of external applications, the plurality of event messages comprising search artifacts associated with the plurality of profiles;

storing the event messages in the database;

aggregating search artifacts for each profile of the plurality of profiles to produce aggregated search artifacts;

storing the aggregated search artifacts in the database, wherein each aggregated search artifact is associated with one unique entity identifier;

receiving, in a suggestion engine, a request corresponding to a first profile of the plurality of profiles;

retrieving, from the database, in response to the request, profile information for a plurality of other profiles having a same location, a same second class, and a number of aggregated search artifacts greater than a number of aggregated search artifacts for the first profile; and outputting overlapping attribute values, the overlapping attribute values being attribute values of the additional attributes of the retrieved profile information for the plurality of other profiles that are not included in the additional attributes of the first profile.

17. The non-transitory computer-readable medium of claim 16, wherein the search artifacts comprise search appearances.

18. The non-transitory computer-readable medium of claim 16, wherein the search artifacts comprise views.

19. The non-transitory computer-readable medium of claim 16, wherein determining overlapping attribute values of the additional attributes of the retrieved profile information for the plurality of other profiles that are not included in the additional attributes of the first profile comprises, for each overlapping attribute:

determining a number of other profiles having a particular overlapping attribute value; and comparing the number of other profiles having the particular overlapping attribute value to a threshold value, wherein the particular overlapping attribute value is included in the output overlapping attribute values when the number of other profiles having the particular overlapping attribute value is greater than the threshold value, and wherein the particular overlapping attribute value is not included in the output overlapping attribute values when the number of other profiles having the particular overlapping attribute value is less than the threshold value.

20. The non-transitory computer-readable medium of claim 16, wherein the plurality of additional attributes comprise one or more of a profile verification, a sustainability rating, an ISO certification, or one or more keywords.

* * * * *